United States Patent
Mahaffey (10) Patent No.: US 6,202,005 B1
(45) Date of Patent: Mar. 13, 2001

(54) SYSTEM FOR SELECTIVELY PRINTING MESSAGES AND ADDING INSERTS TO MERCHANT STATEMENTS

(75) Inventor: Ann Mahaffey, Baltimore, MD (US)

(73) Assignee: First Data Corporation, Hackensak, NJ (US)

( * ) Notice: Subject to any disclaimer, the term of this patent is extended or adjusted under 35 U.S.C. 154(b) by 0 days.

(21) Appl. No.: 09/246,025

(22) Filed: Feb. 5, 1999

(51) Int. Cl.⁷ .................................................. G06F 7/00
(52) U.S. Cl. ........................ 700/221; 700/220; 270/1.03
(58) Field of Search ........................... 700/221, 220; 270/52.07, 52.19, 52.14, 1.03

(56) References Cited

U.S. PATENT DOCUMENTS

| | | | |
|---|---|---|---|
| 4,582,312 | * | 4/1986 | Abrams et al. ............... 270/1.03 |
| 4,800,505 | * | 1/1989 | Axelrod et al. ............... 364/478 |
| 4,800,506 | * | 1/1989 | Axelrod et al. ............... 364/478 |
| 4,829,443 | * | 5/1989 | Pinstov et al. ............ 364/464.03 |
| 5,067,088 | * | 11/1991 | Scheiderhan ................. 364/478 |
| 5,114,128 | * | 5/1992 | Harris, Jr. et al. ............. 270/11 |
| 5,177,687 | * | 1/1993 | Baggarly et al. ........... 364/464.03 |
| 5,207,412 | * | 5/1993 | Coons, Jr. et al. ............ 270/1.03 |
| 5,317,654 | * | 5/1994 | Perry et al. .................... 382/61 |
| 5,445,367 | * | 8/1995 | Long ............................. 270/1.1 |
| 5,451,037 | * | 9/1995 | Lundstrom ..................... 270/1.1 |
| 5,547,175 | * | 8/1996 | Graushar et al. ............. 270/1.03 |
| 5,715,653 | * | 2/1998 | Weinmann et al. .............. 53/411 |
| 5,726,897 | * | 3/1998 | Tammi et al. .............. 364/478.09 |
| 5,798,930 | * | 8/1998 | Van Oosten ............... 364/478.01 |
| 5,819,666 | * | 10/1998 | Ishikawa et al. ............ 270/1.03 |

OTHER PUBLICATIONS

International Searching Authority, PCT International Search Report, Feb. 4, 2000, Commissioner of Patents and Trademarks.

* cited by examiner

Primary Examiner—Christopher P. Ellis
Assistant Examiner—Khoi H. Tran
(74) Attorney, Agent, or Firm—Brooks & Kushman P.C.

(57) ABSTRACT

A system for selectively printing messages and adding inserts to merchant statements includes defining messages and inserts. Merchant parameters for each message and insert are then selected. Merchants having the selected parameters for each message and insert are identified. The messages and inserts are associated with the merchant statements of the merchants having the selected merchant parameters. Messages associated with the merchant statements are printed on the merchant statements. Inserts associated with the merchant statements are added to the envelopes containing the merchant statements.

7 Claims, 8 Drawing Sheets

Merchant Selection Screen

Message Priority 3 - Rule Set 2

Effective: 06/10/1999  Expiration: 09/10/1999  Added: 06/01/1999  Changed: 06/08/1999

Requester: My Bank

Text: Call my bank and ask about our summer . . . .

| Field to be tested: | Logical Operator: | Values to test for: |
|---|---|---|
| Merchant Code ▶ | EQ ▶ | 450 ▶ |
| Chain Number ▶ | GT ▶ | 200 ▶ |
| ▶ | ▶ | ▶ |
| ▶ | ▶ | ▶ |
| ▶ | ▶ | ▶ |
| ▶ | ▶ | ▶ |
| ▶ | ▶ | ▶ |
| ▶ | ▶ | ▶ |
| ▶ | ▶ | ▶ |
| ▶ | ▶ | ▶ |

[Clear] [Finish] [Next] [Back] [Cancel]

— 70

Individual Rules

Rule Set 02

/ 80

Merchant Selection Review Screen

Message Priority 3

Effective: 06/10/1999   Expiration: 09/10/1999   Added: 06/01/1999   Changed: 06/08/1999

Requester: My Bank

Text: Call my bank and ask about our summer . . .

Total number of qualifying merchants:   423
Merchant names:

Anna's Boutique
Clothing Connection
Clothes For You
  •
  •
  •
Suits By Alfred

[Text]   [Rules]   [Exit]

FIG. 6

Inserts Identification Screen
Selective Inserts o1 thru 05

Insert #1
- [Rules]
- [Delete]
- Description:
- Form No.:
- Effective: | Expiration:
- Requester: | New Insert #:
- Added: | Changed:
- Print Detail Listing: ▼

2
- [Rules]
- [Delete]
- Description: Yellow Information Page
- Form No.: 12A
- Effective: 06/10/1999 | Expiration: 09/10/1999
- Requester: | New Insert #:
- Added: 06/01/1999 Changed: 06/08/1999
- Print Detail Listing: ▼

3
- [Rules]
- [Delete]
- Description:
- Form No.:
- Effective: | Expiration:
- Requester: | New Insert #:
- Added: | Changed:
- Print Detail Listing: ▼

4
- [Rules]
- [Delete]
- Description:
- Form No.:
- Effective: | Expiration:
- Requester: | New Insert #:
- Added: | Changed:
- Print Detail Listings: ▼

5
- [Rules]
- [Delete]
- Description:
- Form No.:
- Effective: | Expiration:
- Requester: | New Insert #:
- Added: | Changed:
- Print Detail Listing: ▼

[OK] [Cancel] [Next] [Back]

Merchant Selection Review Screen

Insert #2 - Rule Set 1

Effective: 06/10/1999    Expiration: 09/10/1999    Added: 06/01/1999    Changed: 06/08/1999
Requester: My Bank Description: Yellow Information Page
Form No.: 12A

| | Field to be tested: *122* | Logical Operator: *124* | Values to test for: *126* |
|---|---|---|---|
| ☐ | Merchant Code ▼ | GT ▼ | 200 ▼ |
| ☐ | Merchant Code ▼ | LT ▼ | 300 ▼ |
| ☐ | ▼ | ▼ | ▼ |
| ☐ | ▼ | ▼ | ▼ |
| ☐ | ▼ | ▼ | ▼ |
| ☐ | ▼ | ▼ | ▼ |
| ☐ | ▼ | ▼ | ▼ |
| ☐ | ▼ | ▼ | ▼ |
| ☐ | ▼ | ▼ | ▼ |
| ☐ | ▼ | ▼ | ▼ |
| ☐ | ▼ | ▼ | ▼ |

[Clear]  [Finish]  [Next]  [Back]  [Cancel]

SYSTEM FOR SELECTIVELY PRINTING MESSAGES AND ADDING INSERTS TO MERCHANT STATEMENTS

TECHNICAL FIELD

The present invention relates generally to a system and method for defining parameters to selectively control the printing of messages and the placement of inserts into monthly merchant statements.

BACKGROUND ART

Credit companies provide credit to their clients and send monthly statements to their clients regarding the use of the credit. The clients are typically merchants that sell goods and services to consumers on credit. The statements generally inform the merchant on what the merchant was funded for during the processing period. The merchant uses the statement to reconcile specific transaction information regarding all of the transactions that occurred during the processing period. The specific transaction information includes the type of transaction, the amount credited, the credit card used, the date and time, etc.

The monthly statement is the primary communication vehicle between the bank and the merchant. It is desirable to be able to send targeted messages and inserts to the merchants using the monthly statements. In order to enhance the statement as a communication vehicle, there is a need to be able to print selected messages to the statements for selected merchants. Further, there is a need to be able to add selected inserts to the statements for selected merchants.

SUMMARY OF THE INVENTION

Accordingly, it is an object of the present invention to provide a system and method for defining parameters to selectively control the printing of messages and the placement of inserts into monthly mailed statements.

It is another object of the present invention to provide a system and method for providing messages and inserts to monthly statements mailed to merchants in which the messages and inserts are selected based on defined attributes of the merchants.

It is a further object of the present invention to provide a system and method for providing messages and inserts to monthly statements of targeted merchants.

In carrying out the above objects and other objects, the present invention provides a system for selectively printing messages and adding inserts to merchant statements. The system includes a computer for defining a plurality of messages and a plurality of inserts. The computer is operable to select merchant parameters for each message and insert. The computer is further operable to identify merchants that have the selected merchant parameters for each message and insert. The computer associates each message and insert with merchant statements of the merchants having the selected merchant parameters.

Further, in carrying out the above objects and other objects, the present invention provides a method for selectively printing messages and adding inserts to merchant statements. The method includes defining a plurality of messages and a plurality of inserts. Merchant parameters are then selected for each message and insert. Merchants that have the selected merchant parameters are then identified for each message and insert. Each message and insert is then associated with merchant statements of the merchants having the selected merchant parameters.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIGS. 5A and 5B illustrate multiple merchant selection GUIs that are associated with a defined message;

BEST MODES FOR CARRYING OUT THE INVENTION

Figure 1:
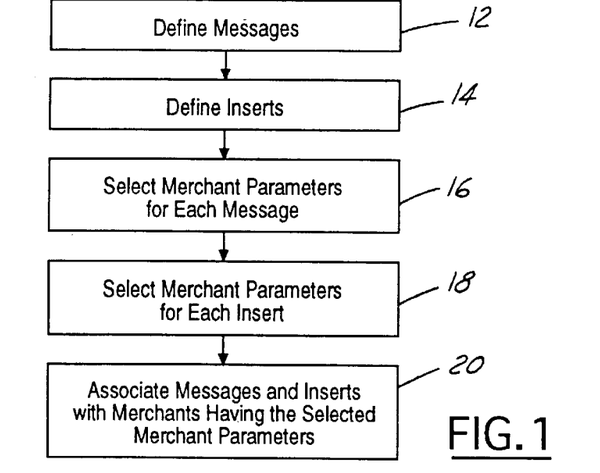
FIG. 1 illustrates a flow diagram representing operation of a system and method according to the present invention.

Referring now to FIG. 1, a flow diagram 10 representing operation of a system and method according to the present invention is shown. Initially, block 12 prompts a user to define a message. A message is a blurb that is to be printed on the cover page of the monthly statement for a merchant. The message may also be printed at other locations such as various section breaks of the monthly statement. More than one message may be printed on the monthly statement and the user may define many messages.

Each message includes text, a priority code, an effective date, an expiration date, a print detail listing, and a requester identifier. The text is the blurb to be printed on the monthly statement. The priority code dictates the sequence in which multiple messages are printed on the monthly statement. The effective date is the date on which the message may be printed on monthly statements having a printing date after or on the effective date. The expiration date is the date on which the message is not to be printed on monthly statements having a printing date after or on the expiration date. The print detail listing is a flag which is used by a processor to list the merchants qualifying for the message. The requester identifier identifies the user that defined the message.

Block 14 then prompts the user to define an insert. An insert is a pre-printed document that is to be inserted into the envelope in which the monthly statement of the merchant is mailed. Inserts require planning so that they are produced in a timely fashion, shipped to the printer by an acceptable date, and meet all physical parameters required by the printer regarding weight, size, and paper thickness. In general, the ability to support selective inserts is dependent upon the hardware capabilities of the physical printer operations. More than one insert may be added to the monthly statement and the user may define many inserts.

Each insert includes a description, a form number, an effective date, an expiration date, a print detail listing, and a requester identifier. The description and the form number provided are directions used by stuffing machine operators for loading the insertion documents with the monthly statements. The effective and expiration dates indicate when the inserts are to be inserted. The print detail listing is a flag which is used by a processor to list the merchants qualifying for the insert. The requester identifier identifies the user that defined the insert.

After the messages and inserts are defined, block 16 continues with selecting the merchant parameters for each message and block 18 continues with selecting the merchant parameters for each insert. The parameters are criteria or rules. The merchants having the characteristics which satisfy the rules for a message will be identified in block 20 to receive that message on their statement. Similarly, the merchants having the characteristics which satisfy the rules for an insert will be identified in block 20 to receive that insert with their statement.

Both the enhanced messages and the selective inserts are based on the user being able to define attributes of selected merchant groups to which they would like to target messages and inserts. For instance, the user can set the rules such that for all merchants with a code of 1234, message one is printed, or for all merchants that are entitled to a certain product, insert three is provided, etc. The merchant attributes for which selection specifications can be defined include the following: market segment, standard industry classification, credit card merchant category code, marker bank, business number, bank number, agent number, corporate number, chain number, DBA state, bill to state, DBA zip code, bill to zip code, processing mode (paperless indicator), internal account merchant number, and status code.

Figure 2:
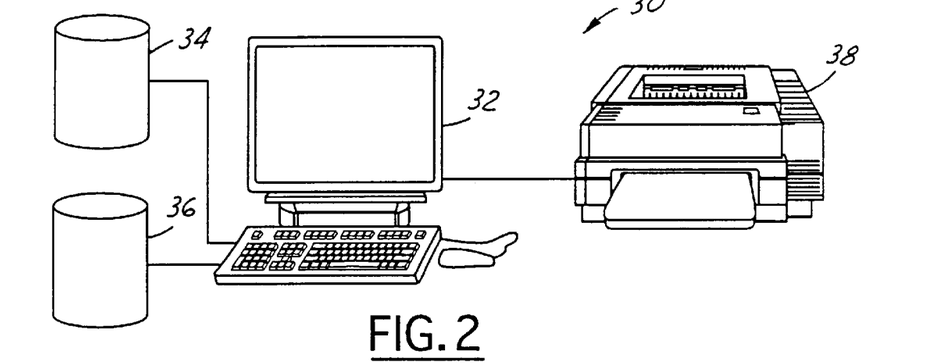
FIG. 2 illustrates a system for carrying out the method of the present invention.

Referring now to FIG. 2, a system 30 for carrying out the method of the present invention is shown. System 30 includes a personal computer 32 in operable communication with first and second memory databases 34 and 36 and a printer 38. First database 34 stores the defined messages and second database 36 stores the defined inserts. The user uses computer 32 to define the messages and the inserts. After the messages and the inserts are defined, the user uses computer 32 to select the merchant parameters for each message and insert.

Computer 32 then processes the merchant data and identifies all merchants meeting the selected merchant parameters for each message and insert. Computer 32 then controls printer 38 to print a message on the monthly statements of merchants that meet the selected merchant parameters for that message. If a merchant meets the selected merchant parameters for more than one message, then computer 32 controls printer 38 to print all of the messages on to the monthly statement for that merchant in accordance with a priority code. For each message, computer 32 may also display and/or control printer 38 to print out a list of merchants that satisfy the selected merchant parameters for that message.

For each insert, computer 32 then displays and/or controls printer 38 to print out a list of merchants that satisfy the selected merchant parameters for that insert. A description and form number of the insert associated with each merchant may also be displayed and/or printed. Stuffing machine operators refer to this information as directions for loading the insertion documents into the envelope of the monthly statement to be mailed to the merchant. A merchant may receive more than one insert if the merchant satisfies the merchant parameters of more than one insert.

Figure 3:
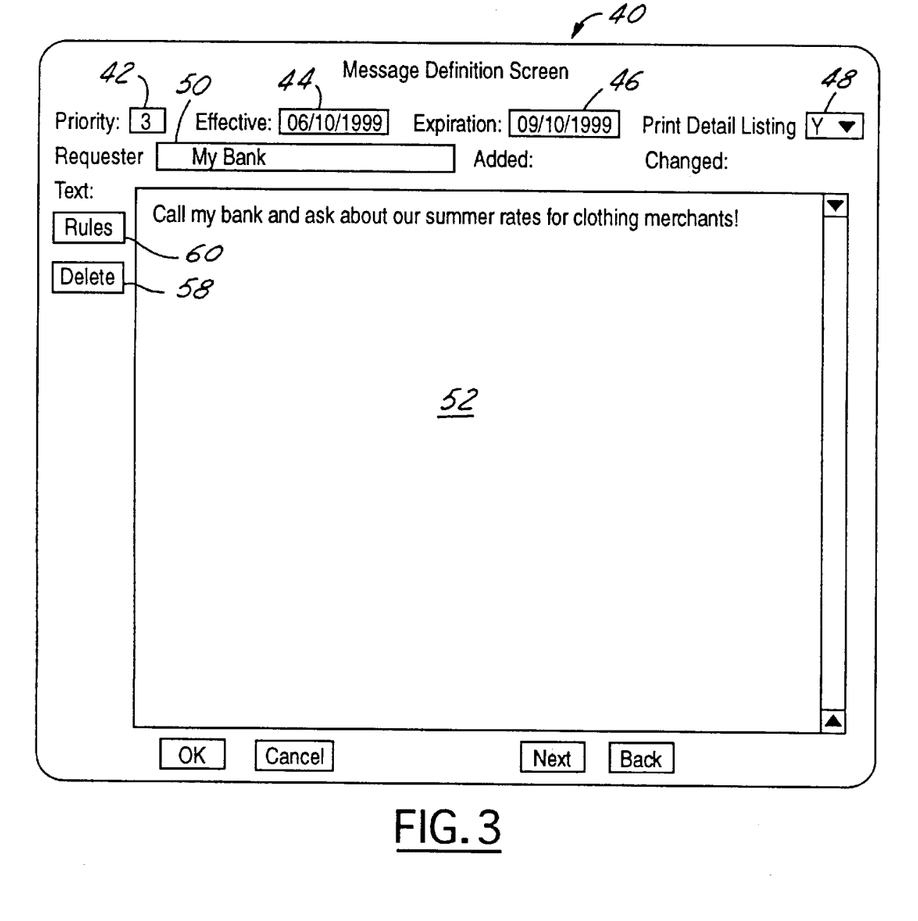
FIG. 3 illustrates a message definition graphical user interface (GUI) used for defining a message.

Computer 32 includes many graphical user interfaces (GUI) that are used by a user for defining the messages, the inserts, and the parameters controlling the printing of the messages and the placement of the inserts. Referring now to FIG. 3, a message definition GUI 40 displayed by computer 32 is shown. A message definition GUI 40 is associated with each message. The user enters information into message definition GUI 40 to define a message. Message definition GUI 40 includes for each message the following: a priority number entry area 42, an effective date entry area 44, an expiration date entry area 46, a print detail listing entry area 48, a requester identification entry area 50, and a text entry area 52. To define a message, the user enters information into the entry areas. The user may browse through defined messages by clicking next and back buttons 54 and 56. The user may delete obsolete messages by clicking delete button 58. After defining a message, the user may click rules button 60 to either view the merchant parameters associated with that message or to select the merchant parameters to be associated with that message.

Figure 4:
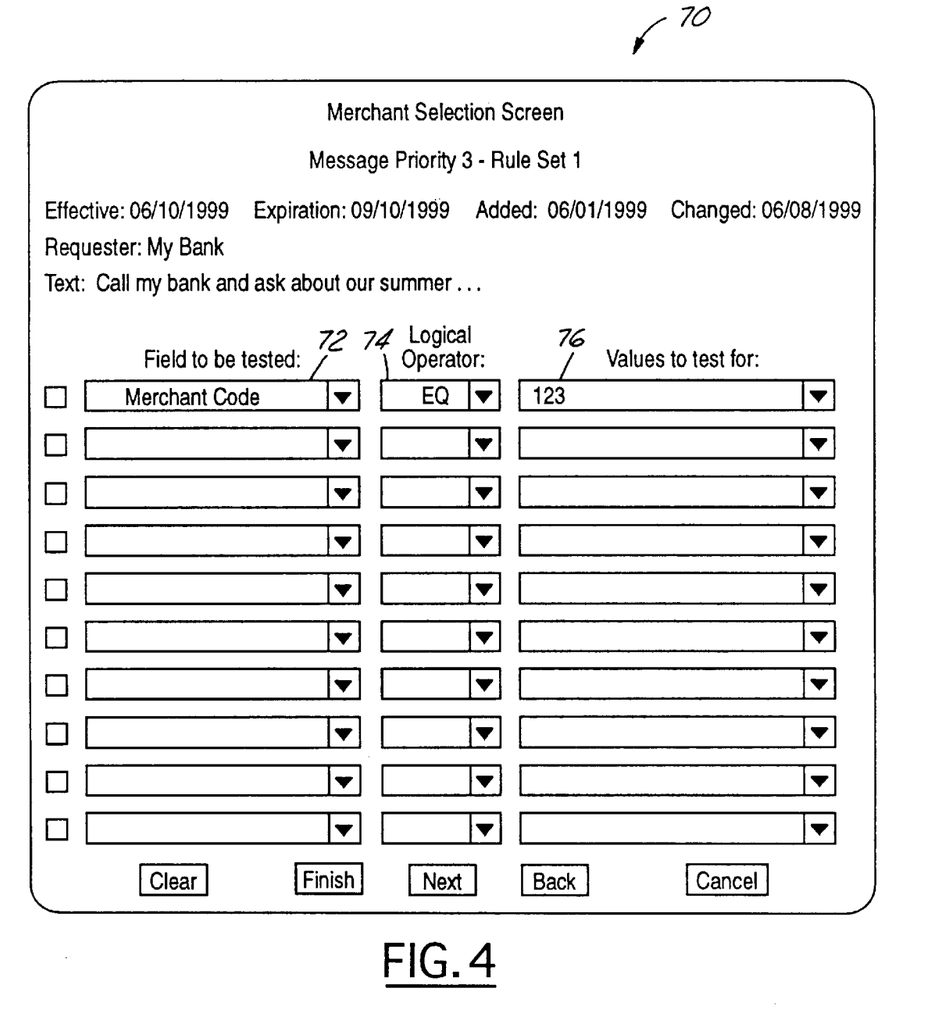
FIG. 4 illustrates a merchant selection GUI that is associated with each defined message and includes the merchant parameters to be tested to identify merchants that meet the selected parameters for that message.

Referring now to FIG. 4, upon clicking rules button 60, computer 32 displays a merchant selection GUI 70. A merchant selection GUI 70 is associated with each defined message and includes the merchant parameters to be tested to identify merchants that meet the selected parameters for that message. Merchant selection GUI 70 includes the message priority, effective and expiration dates, added and changed dates, the requester identifier, and at least one line of the text of the message. The added date is the date on which a merchant selection GUI 70 has been associated with a message. The changed date is the last date on which the merchant selection GUI 70 associated with a message has been changed. The at least one line of text is used by a user to quickly determine the message that is associated with merchant selection GUI 70.

Merchant selection GUI 70 further includes a set of field to be tested entry areas 72, a logical operator entry area 74, and a values to test for entry area 76. The user can select the merchant attributes identified above such as market segment, standard industry classification, credit card merchant category code, etc., in field to be tested entry areas 72. For each entry entered in a field to be tested entry area 72, the user enters, or selects from a list, a logical operator code in respective logical operator entry areas 74. The logical operator code includes the following: EQ is equal to, NE is not equal to, GT is greater than, GE is greater than or equal to, LT is less than, and LE is less than or equal to. The user then enters, or selects from a list, the values to test for in respective values to test for entry areas 76.

Each field to be tested entry along with the associated logical operator and values to test for is considered as a single rule. Each rule defined in merchant selection GUI 70 has an AND relationship with the other rules such that all defined rules on merchant selection GUI 70 must be true for a merchant to qualify for the message.

Figure 5A:
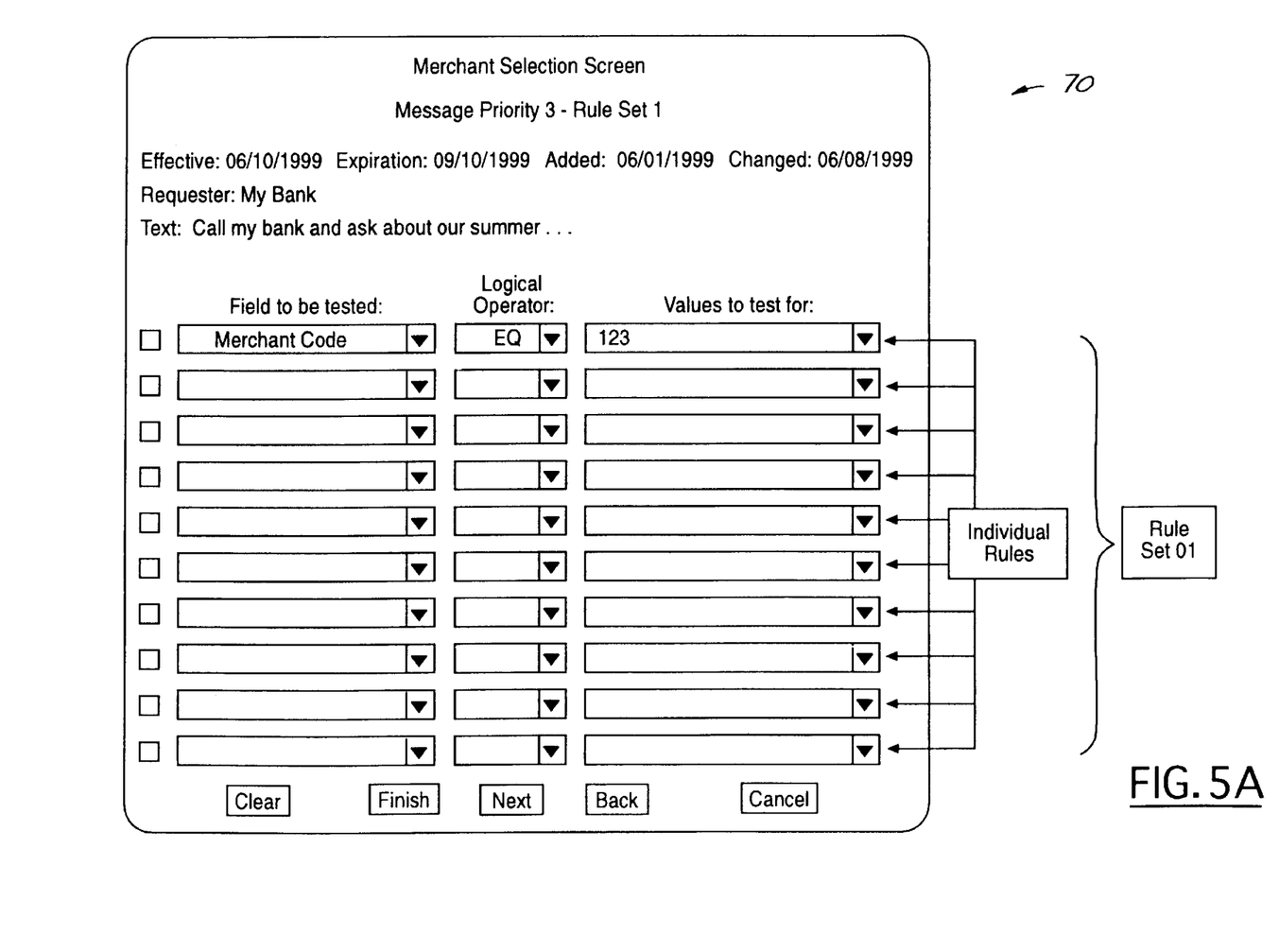

Referring now to FIGS. 5A and 5B, a message may be associated with more than one merchant selection GUI 70. In this case, the message has a rules group made up of one or more merchant selection GUIs 70 each containing a respective rule set. Each rule set is defined by individual rules on a single merchant selection GUI 70. The individual rules have an AND relationship while the rule sets have an OR relationship. A merchant qualifies for a message if it satisfies all of the rules on any single merchant selection GUI 70 associated with that message.

Figure 6:
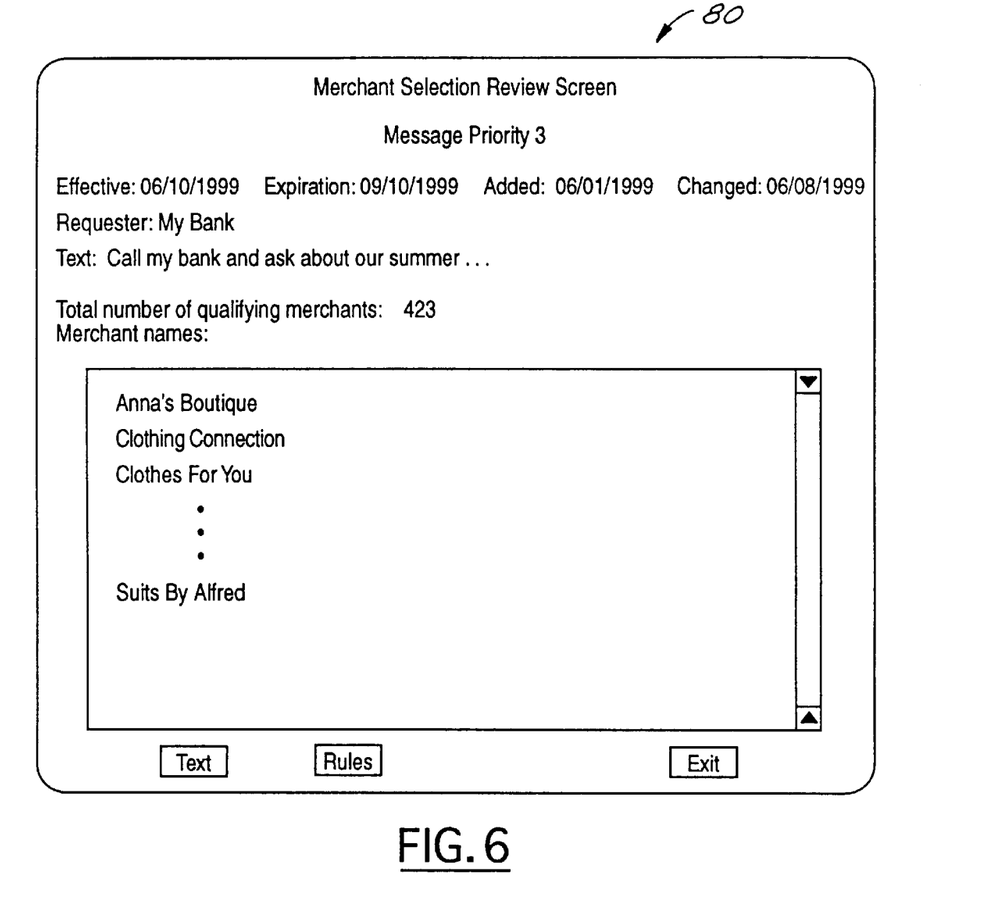
FIG. 6 illustrates a merchant selection review screen which contains a list of those merchants that have qualified for the rules of a particular message.

Referring now to FIG. 6, after the selection rules have been defined, computer 32 may display merchant selection review screen 80. Merchant selection review screen 80 contains a list of those merchants that have qualified for the rules for a particular message. Computer 32 may also control printer 38 to print the particular message on to the monthly statement of the listed merchants.

Figure 7:
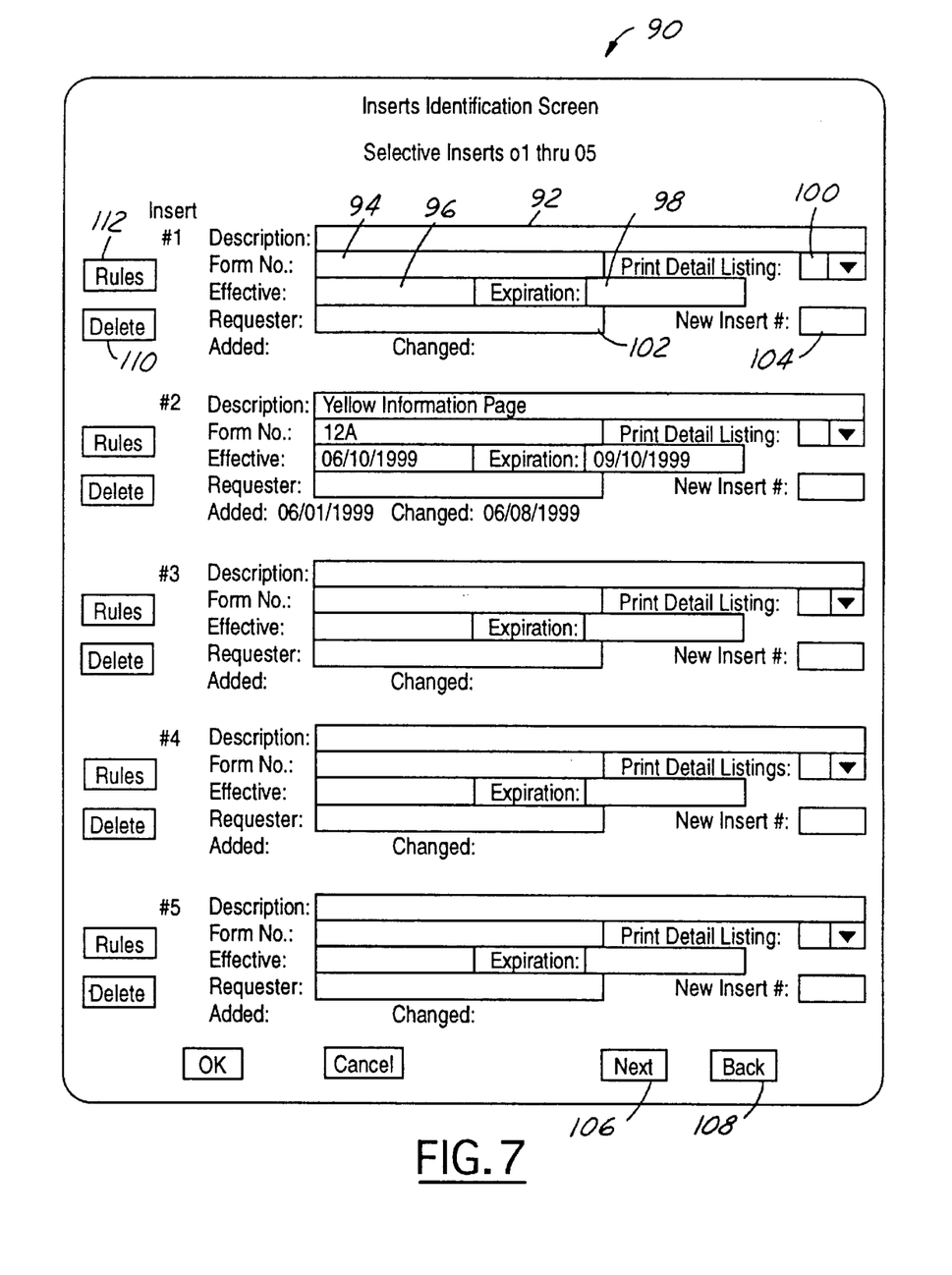
FIG. 7 illustrates an insert identification GUI used for defining an insert.

Referring now to FIG. 7, an insert identification GUI 90 displayed by computer 32 is shown. An insert identification GUI 90 is associated with each insert. The user enters information into insert identification GUI 90 to define an insert. Insert identification GUI 90 includes for each insert the following: a description entry area 92, a form number entry area 94, an effective date entry area 96, an expiration date entry area 98, a print detail listing entry area 100, a requester identifier entry area 102, and a new insert number entry area 104. To define an insert, the user enters information into the entry areas. The user may browse through defined inserts by clicking next and back buttons 106 and 108. The user may delete obsolete inserts by clicking delete button 110. After defining an insert, the user may click rules button 112 to either view the merchant parameters associated with that insert or to select the merchant parameters to be associated with that insert.

Figure 8:
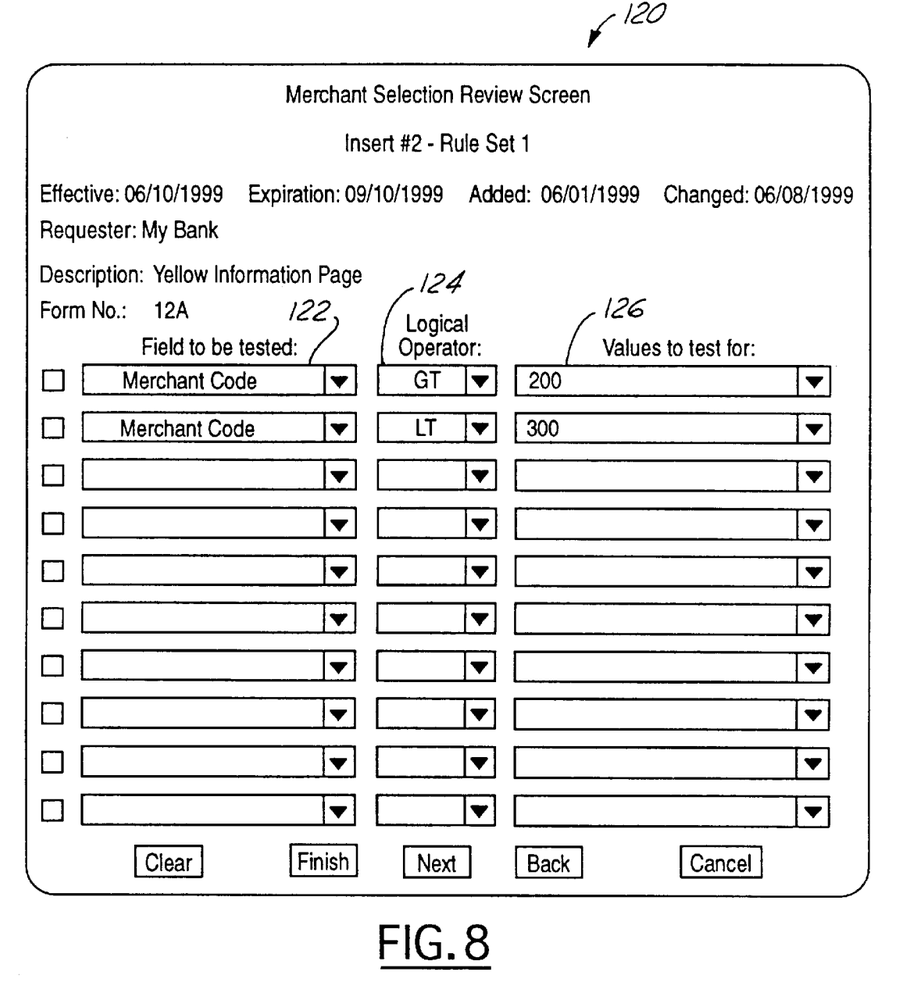
FIG. 8 illustrates a merchant selection GUI that is associated with each defined insert and includes the merchant parameters to be tested to identify merchants that meet the selected parameters for that insert.

Referring now to FIG. 8, upon clicking rules button 112, computer 32 displays a merchant selection GUI 120. A merchant selection GUI 120 is associated with each defined insert and includes the merchant parameters to be tested to identify merchants that meet the selected parameters for that insert. Merchant selection GUI 70 includes the effective, expiration, added, and changed dates, the requester identifier, the description, and the form number. The description and the form number are used as directions by stuffing machine operators for loading the inserts into the envelopes of the mailed statements.

Merchant selection GUI 120 further includes, for each rule, a field to be tested entry area 122, a logical operator entry area 124, and a values to test for entry area 126. The user can select the merchant attributes identified above in field to be tested entry areas 122. For each entry entered in a field to be tested entry area 122, the user enters, or selects from a list, a logical operator code in respective logical operator entry areas 124. The user then enters, or selects from a list, the values to test for in respective values to test for entry areas 126.

Each field to be tested entry along with the associated logical operator and values to test for is considered as a single rule. Each rule defined in merchant selection GUI 120 has an AND relationship with the other rules such that all defined rules on merchant selection GUI 120 must be true for a merchant to qualify for the insert. Like messages, an insert may be associated with more than one merchant selection GUI.

Figure 9:
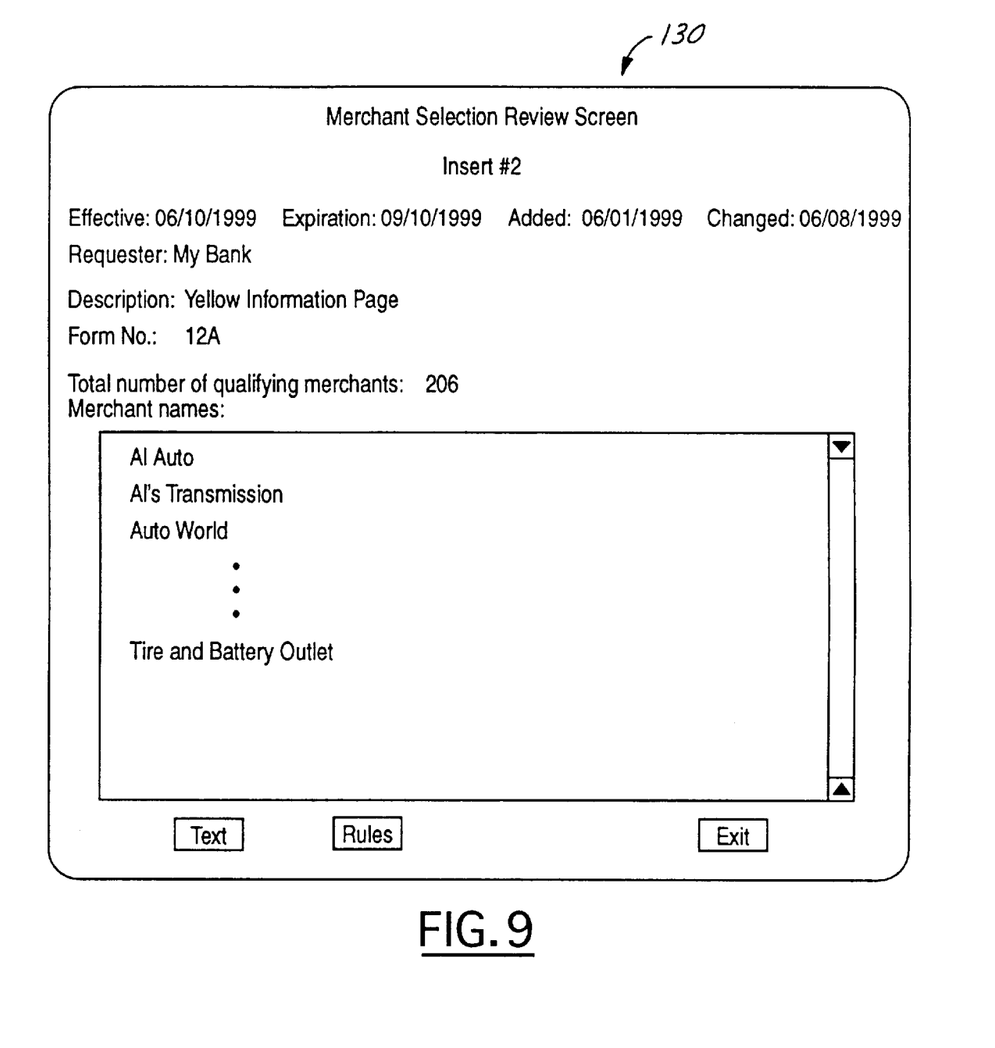
FIG. 9 illustrates a merchant selection review screen which contains a list of those merchants that have qualified for the rules for a particular insert.

Referring now to FIG. 9, after the selection rules have been defined, computer 32 may display merchant selection review screen 130. Merchant selection review screen 130 contains a list of those merchants that have qualified for the rules for a particular insert. Stuffing operators review the list to determine which merchants are to receive the insert with their monthly mailed statement.

Thus it is apparent that there has been provided, in accordance with the present invention, a system and method for selectively printing messages and adding inserts to merchant statements, that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for selectively printing messages to merchant statements to be mailed within envelopes to merchants and for selectively adding inserts to the envelopes containing the merchant statements, the merchant statements regarding credit transactions between the merchants and consumers of the merchants, the system comprising:

a computer for defining a plurality of messages to be printed on the merchant statements and for defining a plurality of inserts to be inserted into envelopes containing the merchant statements, the computer defining each message to contain text to be printed on the merchant statements, the computer defining each insert to be a printed document for insertion into the envelopes containing the merchant statements, wherein the computer includes a graphical user interface for enabling a user to define a message and for enabling a user to define an insert, wherein the computer defines a respective merchant parameter to be associated with each message and insert, the merchant parameters defining characteristics that merchants must satisfy to receive merchant statements having messages and inserts associated with the respective merchant parameters, wherein the computer identifies merchants satisfying the characteristic of each merchant parameter, wherein the computer associates a message with the merchant statement of a merchant if the merchant has been identified as satisfying the characteristic of the merchant parameter associated with the message, wherein the computer associates an insert with the merchant statement of a merchant if the merchant has been identified as satisfying the characteristic of the merchant parameter associated with the insert, wherein the computer generates directions for adding inserts associated with the merchant statements of the merchants; and a printer for printing messages associated with merchant statements of the merchants onto the merchant statements of the merchants.

2. The system of claim 1 wherein: the merchant parameters include a merchant category code.

3. The system of claim 1 wherein:

the computer further defining each message to contain a priority code, an effective date, an expiration date, a print detail listing, and a requestor identifier.

4. The system of claim 3 wherein:

the print detail listing is a flag used by the computer for listing the merchants identified as satisfying the characteristic of the merchant parameter associated with a message.

5. The system of claim 1 wherein:

the computer further defining each insert to have a description, a form number, an expiration date, a print detail listing, and a requester identifier.

6. The system of claim 5 wherein:

the print detail listing is a flag used by the computer for listing the merchants identified as satisfying the characteristic of the merchant parameter associated with an insert.

7. The system of claim 1 wherein:

the computer includes a graphical user interface for enabling a user to define a merchant parameter.

* * * * *